US011385383B2

(12) United States Patent
Lavine et al.

(10) Patent No.: US 11,385,383 B2
(45) Date of Patent: Jul. 12, 2022

(54) COATING STRESS MITIGATION THROUGH FRONT SURFACE COATING MANIPULATION ON ULTRA-HIGH REFLECTORS OR OTHER OPTICAL DEVICES

(71) Applicant: Raytheon Company, Waltham, MA (US)

(72) Inventors: Jason R. Lavine, McKinney, TX (US); Shu-Chung Chiao, Allen, TX (US); Robert K. Bratton, Leonard, TX (US)

(73) Assignee: Raytheon Company, Waltham, MA (US)

( * ) Notice: Subject to any disclaimer, the term of this patent is extended or adjusted under 35 U.S.C. 154(b) by 128 days.

(21) Appl. No.: 16/189,691

(22) Filed: Nov. 13, 2018

(65) Prior Publication Data
US 2020/0150315 A1 May 14, 2020

(51) Int. Cl.
*G02B 5/08* (2006.01)
*G02B 1/12* (2006.01)
*G02B 1/14* (2015.01)

(52) U.S. Cl.
CPC .............. *G02B 1/12* (2013.01); *G02B 1/14* (2015.01); *G02B 5/085* (2013.01)

(58) Field of Classification Search
CPC . G02B 1/12; G02B 1/14; G02B 5/085; G02B 5/08; G02B 5/0833; G02B 5/0808; G21K 1/06
USPC ........... 359/584, 359, 360, 585, 869; 378/84
See application file for complete search history.

(56) References Cited

U.S. PATENT DOCUMENTS

| 3,947,302 | A | 3/1976 | Grossman |
| 4,814,232 | A | 3/1989 | Bluege et al. |
| 4,865,451 | A | 9/1989 | Ahonen et al. |
| 5,424,876 | A | 6/1995 | Fujii |
| 5,717,532 | A | 2/1998 | Chiba et al. |
| 5,912,777 | A | 6/1999 | Jaworske |
| 5,933,278 | A | 8/1999 | Plummer et al. |

(Continued)

FOREIGN PATENT DOCUMENTS

| EP | 0456488 A1 | 11/1991 |
| JP | H7-168008 A | 7/1995 |

(Continued)

OTHER PUBLICATIONS

International Search Report and Written Opinion of the International Searching Authority in connection with International Patent Application No. PCT/US2019/039179 dated Sep. 5, 2019, 13 pages.

*Primary Examiner* — Audrey Y Chang (57) ABSTRACT

An apparatus includes an optical device that includes a substrate, a first layer of material over the substrate, and a second layer of material comprising an optical coating over the first layer of material. The first layer of material creates a first stress within the optical device that counteracts a second stress within the optical device created by the second layer of material. The optical device may also include a third layer of material positioned between the substrate and the first layer of material. In some cases, the second layer of material creates a compressive stress within the optical device, and the first layer of material creates a tensile stress within the optical device that counteracts the compressive stress within the optical device.

20 Claims, 4 Drawing Sheets

(56) References Cited

U.S. PATENT DOCUMENTS

| | | | |
|---|---|---|---|
| 6,011,646 A | 1/2000 | Mirkarimi et al. | |
| 6,078,425 A | 6/2000 | Wolfe et al. | |
| 6,495,272 B1 | 12/2002 | Creber et al. | |
| 6,587,263 B1 | 7/2003 | Iacovangelo et al. | |
| 6,598,985 B2 | 7/2003 | Hagelin et al. | |
| 6,921,177 B2 * | 7/2005 | Schaefer | G02B 5/0808 359/883 |
| 7,220,489 B1 | 5/2007 | Wei et al. | |
| 10,502,965 B2 * | 12/2019 | Wang | G02B 5/0833 |
| 2003/0231415 A1 | 12/2003 | Puerto | |
| 2005/0008852 A1 * | 1/2005 | Hartig | C03C 17/3626 428/336 |
| 2007/0188610 A1 * | 8/2007 | Micotto | G01C 11/025 348/144 |
| 2007/0211358 A1 * | 9/2007 | Setoguchi | G02B 5/0808 359/883 |
| 2008/0316500 A1 * | 12/2008 | Schulte | G01B 9/02057 356/521 |
| 2011/0134552 A1 * | 6/2011 | Kner | G02B 26/0825 359/847 |
| 2014/0329174 A1 * | 11/2014 | Hamamoto | G03F 1/50 430/5 |
| 2016/0349410 A1 | 12/2016 | Yao et al. | |
| 2017/0139085 A1 | 5/2017 | Schurmann et al. | |
| 2017/0176654 A1 * | 6/2017 | Sawyer | G02B 5/085 |

FOREIGN PATENT DOCUMENTS

| | | |
|---|---|---|
| JP | H8-68897 A | 3/1996 |
| JP | H10-339799 A | 12/1998 |
| JP | 2004-31952 A | 1/2004 |

* cited by examiner

COATING STRESS MITIGATION THROUGH FRONT SURFACE COATING MANIPULATION ON ULTRA-HIGH REFLECTORS OR OTHER OPTICAL DEVICES

TECHNICAL FIELD

This disclosure generally relates to optical devices. More specifically, this disclosure relates to coating stress mitigation through front surface coating manipulation on ultra-high reflectors or other optical devices.

BACKGROUND

Various types of systems use mirrors or other optical devices having thick optical coatings. For example, high-energy laser (HEL) systems often use mirrors with thick reflective coatings as beam directors to control where high-energy beams are directed. As another example, various optical filters utilize thick optical coatings for reflective or anti-reflective purposes. Other types of optical devices having thick optical coatings include ultraviolet lithography condenser mirrors, reflective laser scanner mirrors, exo-atmospheric reflecting optics, and systems in which low scattering is needed for visible radiation. Unfortunately, thick coatings applied to mirrors or other optical devices typically create large amounts of stress within the optical devices. As a result, it is common for large mirrors or other optical devices to bend or warp after thick coatings are applied, which is often highly undesirable. For instance, bending or warping of a mirror can ruin the wavefront of optical signals reflected off the mirror.

SUMMARY

This disclosure provides coating stress mitigation through front surface coating manipulation on ultra-high reflectors or other optical devices.

In a first embodiment, an apparatus includes an optical device that includes a substrate, a first layer of material over the substrate, and a second layer of material comprising an optical coating over the first layer of material. The first layer of material creates a first stress within the optical device that counteracts a second stress within the optical device created by the second layer of material.

In a second embodiment, a system includes a plurality of optical devices configured to receive and process at least one optical beam. Each of at least one of the optical devices includes a substrate, a first layer of material over the substrate, and a second layer of material comprising an optical coating over the first layer of material. The first layer of material creates a first stress within the optical device that counteracts a second stress within the optical device created by the second layer of material.

In a third embodiment, a method includes forming a first layer of material over a substrate of an optical device. The method also includes forming a second layer of material comprising an optical coating over the first layer of material. The first layer of material creates a first stress within the optical device that counteracts a second stress within the optical device created by the second layer of material.

Other technical features may be readily apparent to one skilled in the art from the following figures, descriptions, and claims.

BRIEF DESCRIPTION OF THE DRAWINGS

For a more complete understanding of this disclosure, reference is made to the following description, taken in conjunction with the accompanying drawings, in which.

DETAILED DESCRIPTION

FIGS. 1A through 4, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

As noted above, various systems use mirrors or other optical devices having thick optical coatings. However, thick coatings applied to mirrors or other optical devices can create large amounts of stress within the optical devices. As a result, it is common for large mirrors or other optical devices to bend or warp, which is often highly undesirable. To combat this problem, in one prior approach, a backside coating is applied to an optical device to bend or warp the optical device back into a desired form. However, for many optical devices, backside compensation may not be an option. For example, backside coatings often cannot be used with optical devices having non-symmetric front and back surfaces. Also, optical devices that use complicated coatings or that have non-uniform thicknesses are often not good candidates for backside compensation. When backside compensation cannot be used, optical devices are often cut to compensate for the stresses induced by their optical coatings. However, this typically requires that an optical coating be applied uniformly onto an optical device, so this approach cannot be used with optical devices having non-uniform coatings. In addition, this approach can still lead to large wavefront errors and poor optical quality, and it requires forming larger optical devices than necessary (which increases costs and manufacturing times).

This disclosure describes various techniques for coating stress mitigation through front surface coating manipulation on ultra-high reflectors or other optical devices. As described in more detail below, an optical device includes one or more layers of material (such as one or more thick optical coatings) that create a first stress within the optical device. If unaddressed, this first stress can warp or bend the optical device. The optical device therefore incorporates one or more additional layers of material that intentionally create an additional second stress within the optical device. The second stress at least partially counteracts or compensates for the first stress within the optical device. In some embodiments, the one or more additional layers of material create a tensile stress that compensates for a compressive stress created by one or more thick optical coatings. However, any other stresses can exist in the optical device.

In this way, an optical device having a desired shape can be manufactured more effectively. This is because the additional layer(s) of material provide stress compensation within the optical device itself, which helps to provide improved bending or warping resistance. As a result, optical devices having less wavefront errors or other optical errors can be manufactured. Also, the one or more additional layers of material can be applied in the same area or areas where a reflective coating or other thick optical coating is applied. There is therefore little or no need to apply a separate backside coating during a separate backside compensation process in order to compensate for the stress created by the thick optical coating. Further, the techniques described below can be used with optical devices that have complicated coatings or non-uniform thicknesses. Moreover, aluminum mirrors or other polished metal mirrors have the potential to function as ultra-high reflectors in high-energy laser (HEL) systems or other systems while reducing weight and increasing aperture size, but these types of mirrors often cannot be polished adequately to meet specific HEL or other requirements. The techniques described below can be used with polished aluminum or other metal mirrors to fabricate fully functional ultra-high reflectors. In addition, the techniques described below allow significantly shorter manufacturing times to be achieved compared to approaches where mirrors or other devices are freeform cut to compensate for stresses induced by optical coatings, and these techniques may even allow for the fabrication of a "zero stress" optical devices.

Figure 1A:
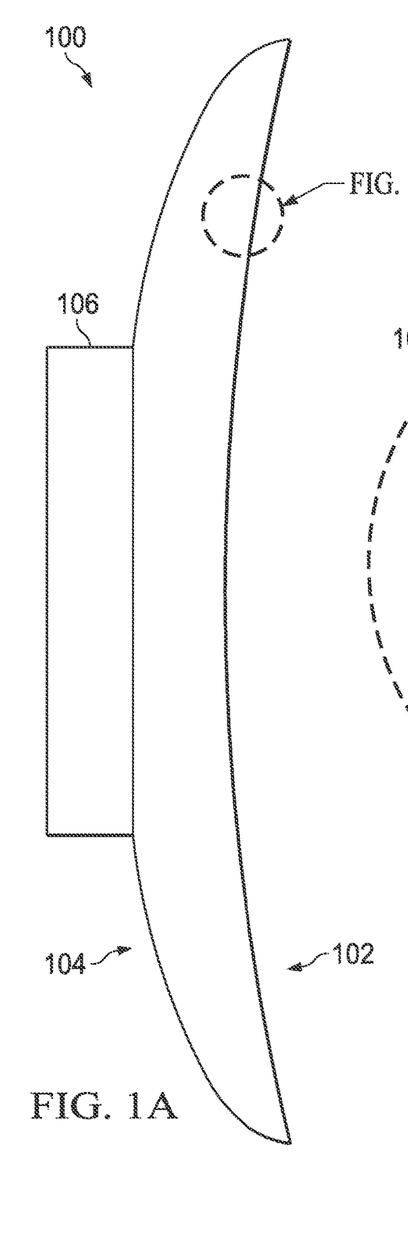
FIGS. 1A and 1B illustrate an example optical device having coating stress mitigation through front surface coating manipulation in accordance with this disclosure.
Figure 1B:
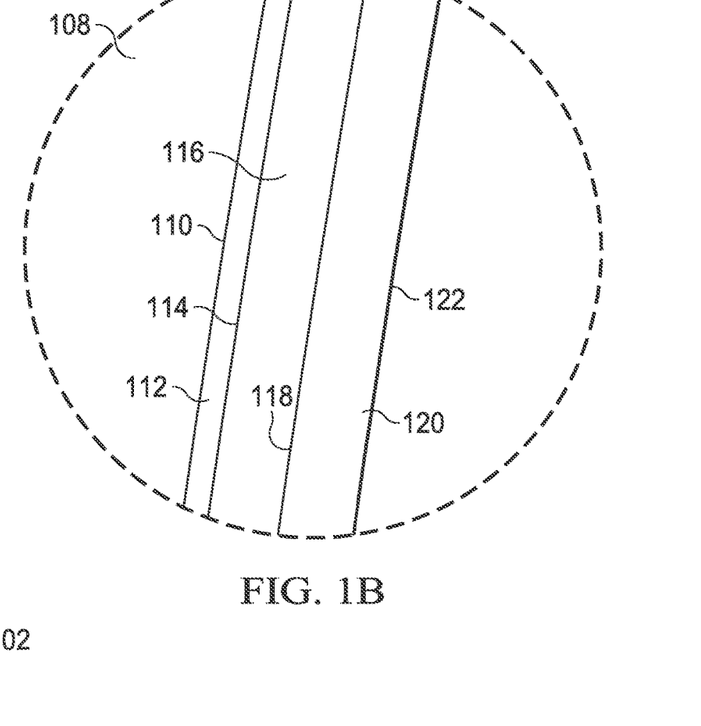

FIGS. 1A and 1B illustrate an example optical device 100 having coating stress mitigation through front surface coating manipulation in accordance with this disclosure. The embodiment of the optical device 100 shown in FIGS. 1A and 1B is for illustration only. Any other suitable optical device can support coating stress mitigation through front surface coating manipulation as described in this patent document.

As shown in FIG. 1A, the optical device 100 generally represents a mirror having a reflective front surface 102 and a back surface 104, and at least a portion of the back surface 104 may be non-reflective. The front surface 102 of the optical device 100 can represent a high-precision surface used to reflect radiation. Depending on the implementation, the optical device 100 can be designed to reflect radiation at any suitable wavelength(s) or in any suitable wavelength band(s), such as visible, infrared, or ultraviolet light. In this example, the front surface 102 represents a reflective concave surface. However, the mirror can have any other suitable reflective surface(s), such as a convex reflective surface, a planar reflective surface, or an aspheric reflective surface.

As can be seen in FIG. 1A, the back surface 104 of the optical device 100 is not symmetric with the front surface 102. As a result, the optical device 100 has a non-uniform thickness that tapers moving out from a center of the optical device 100. Also, there is a mirror hub 106 positioned along the back surface 104 of the optical device 100. The mirror hub 106 generally represents a structure that can be bolted or otherwise fastened to a support structure or other structure in order to secure the optical device 100 in place. However, the optical device 100 can be coupled to a support structure or other structure in any other suitable manner.

As shown in the enlarged portion of the optical device 100 in FIG. 1B, the optical device 100 includes a substrate 108. The substrate 108 generally represents a structure on which various layers of material are deposited or otherwise placed to form a mirror or other optical device. The substrate 108 can be formed from any suitable material(s). In some embodiments, the substrate 108 is formed using aluminum or an aluminum alloy, such as an aluminum 6061-T6 alloy. Aluminum 6061-T6 is composed primarily of aluminum, along with alloy elements zinc, chromium, and iron (and may also include elements such as magnesium and silicon). However, the substrate 108 can be formed from any other suitable material(s). The substrate 108 can also be formed in any suitable manner. For instance, the substrate 108 can be formed through casting or injection molding and then subjected to further processing. In addition, the substrate 108 can have any suitable size, shape, and dimensions, such as those based on the intended use of the optical device 100.

A surface 110 of the substrate 108 can represent a precision-formed surface. In some embodiments, the surface 110 of the substrate 108 is smoothed using a machining technique known as diamond point turning (DPT), which is also known as single-point diamond turning (SPDT). DPT processes are widely used in the manufacture of high-quality optical devices. After this type of processing, the surface 110 of the substrate 108 is generally smooth, but the surface 110 still typically includes artifacts in the form of surface roughness. Among other things, this surface roughness can be caused by the presence of alloy elements in the substrate 108, such as the zinc, chromium, and iron alloy elements in the aluminum 6061-T6 alloy. Depending on the processing technique used to smooth the surface 110 of the substrate 108, the surface roughness of the surface 110 can be very small, such as when surface features alter the smoothness of the surface 110 by about 80 Angstroms root mean square (RMS). The surface 110 is said to have a surface roughness of about 80 Angstroms RMS in this example.

A low-stress finishing layer 112 is deposited or otherwise formed over the surface 110 of the substrate 108. The finishing layer 112 can be formed from any suitable material(s), such as nickel-chromium, amorphous silicon, or germanium. The finishing layer 112 can also have any suitable thickness, such as about 0.5 µm or less. However, the finishing layer 112 can have any other suitable thickness that allow for a reduction in the surface roughness of the completed optical device 100, and the thickness may be uniform or non-uniform. In addition, the finishing layer 112 can be formed in any suitable manner, such as by using a thin-film vapor deposition technique or other thin-film technique. The finishing layer 112 is referred to here as a "low-stress" layer since the finishing layer 112 is ideally thin enough to create little or no stress on the shape of the underlying substrate 108.

Since the finishing layer 112 can represent a thin-film layer, the outer surface 114 of the finishing layer 112 will generally conform to some degree to the contour of the surface 110 of the substrate 108. Thus, the finishing layer 112 can initially have approximately the same surface roughness (or a slightly smaller surface roughness) as the surface 110 of the substrate 108. In order to remove peak-to-valley variations in the surface 114, the surface 114 can be polished or otherwise processed to smooth the surface 114.

In some embodiments, polishing of the surface 114 of the finishing layer 112 is performed using a magneto-rheological finishing (MRF) process. In this type of process, a magneto-rheological slurry is used to polish an optical surface, where the slurry typically includes magnetic particles, non-magnetic abrasives, and some additives in water or other fluid. The shape and stiffness of the slurry can be controlled and altered using an applied magnetic field. MRF is an effective process for reducing the surface roughness present in the surface 114 of the finishing layer 112. Note, however, that any other suitable process can be used here to polish the surface 114 of the finishing layer 112. For instance, in other embodiments, a polishing pad can be used with a polishing compound to reduce the surface roughness of the surface 114. In particular embodiments, the polishing of the surface 114 of the finishing layer 112 (however performed) can remove about 500 Angstroms RMS of material from the finishing layer 112. Of course, other amounts of material can be removed as needed or desired. Additional details regarding the formation and processing of the finishing layer 112 can be found in U.S. Pat. No. 6,921,177 B2 (which is hereby incorporated by reference in its entirety).

A pre-stress layer 116 of material is deposited or otherwise formed over the surface 114 of the finishing layer 112, and an optical coating layer 120 is deposited or otherwise formed over a surface 118 of the pre-stress layer 116. The pre-stress layer 116 generally represents a high-stress layer that creates stress within the optical device 100, where that stress is used to compensate for stress created by the optical coating layer 120 within the optical device 100.

The pre-stress layer 116 can be formed from any suitable material(s), such as nickel-chromium, amorphous silicon, or germanium. The pre-stress layer 116 can also have any suitable thickness, such as about 50 µm or less. However, the pre-stress layer 116 can have any other suitable thickness, and the thickness may be uniform or non-uniform. In addition, the pre-stress layer 116 can be formed in any suitable manner, such as by using a vapor deposition technique or other deposition technique. Unlike the finishing layer 112, the pre-stress layer 116 is referred to here as a "high-stress" layer since the pre-stress layer 116 ideally creates a high amount of stress within the optical device 100, which counteracts or compensates for a high amount of stress produced by the optical coating layer 120 within the optical device 100.

The optical coating layer 120 generally represents a layer of material that supports an optical operation of the device 100. For example, in a mirror, the optical coating layer 120 can represent a reflective layer that reflects radiation at one or more desired wavelengths or in one or more desired wavelength bands. In other devices, the optical coating layer 120 can represent a reflective or anti-reflective layer. In some embodiments, such as when the optical device 100 is used with a high-energy laser, the optical coating layer 120 can represent a multi-layer dielectric film. Since the optical coating layer 120 can represent a thin-film layer provided on the pre-stress layer 116, a surface 122 of the optical coating layer 120 has a surface finish comparable to that of the pre-stress layer 116 (which is similar to the surface finish of the finishing layer 112). Ideally, the surface roughness of the surface 122 is significantly smaller that the surface roughness of the surface 110. In some embodiments, the surface roughness of the surface 122 can be extremely small, such as when surface features alter the smoothness of the surface 122 by about 10 Angstroms to about 25 Angstroms RMS. Among other things, this degree of smoothness can be useful when the optical device 100 is used with radiation having wavelengths less than about 3 microns (such as visible radiation).

The optical coating layer 120 can be formed from any suitable material(s). In some embodiments, the optical coating layer 120 of a mirror can represent a broadband high reflector (BBHR) multi-layer dielectric film. The optical coating layer 120 can also have any suitable thickness, such as about 50 µm or less. However, the optical coating layer 120 can have any other suitable thickness, and the thickness may be uniform or non-uniform. In addition, the optical coating layer 120 can be formed in any suitable manner, such as an ion beam sputtering technique or an electron beam evaporation technique (with or without ion assistance coating techniques).

Certain optical coating layers 120 can create large amounts of stress within the optical device 100. The pre-stress layer 116 and the optical coating layer 120 are both high-stress layers, but the stresses created by the layers 116 or 120 counteract each other. As a result, the pre-stress layer 116 can attempt to warp or bend the optical device 100 in one way, and the optical coating layer 120 can attempt to warp or bend the optical device 100 in a substantially opposite way. Because of this, the stress of the pre-stress layer 116 is effectively used to "separate" the stress of the optical coating layer 120 from the substrate 108, thereby minimizing the total stresses on the surface of the substrate 108.

As a particular example of this, one or more specific optical coating layers 120 created using ion beam sputtering or other technique can create large amounts of compressive stress within the optical device 100. This compressive stress generally represents stress that attempts to decrease the length of the optical coating layer 120. By itself, this compressive stress can bend or warp the optical device 100 by pulling the outer edge(s) of the optical device 100 inward. The bending or warping of the optical device 100 can result in poor mirror quality, wavefront errors, or other problems. In contrast, the pre-stress layer 116 can create large amounts of tensile stress within the optical device 100. This tensile stress generally represents stress that attempts to increase the length of the pre-stress layer 116. By itself, this tensile stress can bend or warp the optical device 100 by pushing the outer edge(s) of the optical device 100 outward. Thus, the tensile stress of the pre-stress layer 116 can counteract the compressive stress of the optical coating layer 120, allowing the optical device 100 to achieve a desired form. However, it should be noted that the optical coating layer 120 need not experience compressive stress and the pre-stress layer 116 need not experience tensile stress. For instance, the stresses created by the layers 116 and 120 can be reversed in other embodiments. In general, the pre-stress layer 116 creates a second stress that counteracts a first stress created by the optical coating layer 120.

Note that, in some embodiments, the pre-stress layer 116 can be formed and cause actual deformation of the substrate 108, and the optical coating layer 120 can then be formed and cause actual deformation of the substrate 108 in a substantially opposite direction. In other embodiments, the pre-stress layer 116 and the optical coating layer 120 can be formed around the same time, so there may be little or no actual deformation of the substrate 108. In other words, the various layers of the optical device 100 may or not may prevent actual deformation of the substrate 108. As long as the pre-stress layer 116 counteracts the stress created by the optical coating layer 120 so that the optical device 100 obtains a desired shape, it is immaterial whether actual deformation of the substrate 108 occurs.

While not shown here in FIGS. 1A and 1B, a thin overcoat can be formed over the optical coating layer 120. The thin overcoat can be used to protect the optical coating layer 120, to increase a reflectance of the optical device 100 within a selected wavelength band, or to perform another desired function. For example, if the optical device 100 is intended for use with radiation in the visible and near infrared wavelength bands, an overcoat of silicon dioxide ($SiO_2$)

with a thickness of about 1,500 Angstroms RMS can be applied over the optical coating layer 120. However, various other materials can be used for the overcoat, which can depend (at least in part) on the intended use for the optical device 100. Other example overcoat materials include silicon oxide (SiO), tantalum oxide ($Ta_2O_5$), titanium oxide ($TiO_2$), and zirconium oxide ($ZrO_2$). The overcoat can be formed in any suitable manner, such as using a thin-film deposition technique or other deposition technique.

Note that the layers 112, 116, and 120 can be formed entirely on the front surface 102 of the optical device 100, or the layers 112, 116, and 120 can wrap around the outer edge(s) of the optical device 100 and cover part or all of the back surface 104 of the optical device 100. Also note that the layers 112, 116, and 120 can completely cover the front surface 102 of the optical device 100, or the layers 112, 116, and 120 can cover part (but not all) of the front surface 102 of the optical device 100. Further note that the layers 112, 116, and 120 may (but need not) have substantially constant thicknesses in all areas of application or formation. The thickness of each layer 112, 116, and 120 can be constant or vary as needed or desired. In addition, note that the substrate 108 in this example has a non-uniform thickness, although the substrate 108 can have a uniform thickness if needed or desired.

By incorporating the pre-stress layer 116 into the optical device 100 itself, the stress induced on the substrate 108 by the optical coating layer 120 can be reduced or substantially eliminated. The optical device 100 can therefore be fabricated having a desired shape more easily, and wavefront errors or other optical errors can be reduced. Also, no separate backside compensation process may be needed to compensate for bending or warping of the optical device 100, and only a single DPT operation may be needed. Moreover, the DPT operation and the formation of various thin-film layers can be performed using known equipment and techniques, which helps to simplify and reduce the costs associated with manufacturing the optical device 100. Further, the optical device 100 can easily incorporate a polished metal structure as the substrate 108, enabling use of the optical device 100 in HEL systems or other systems where reduced weight and increased aperture size are desirable. In addition, the optical device 100 can be fabricated much more quickly and easily compared to conventional approaches.

In some embodiments, a pre-stress layer 116 can be designed to reduce the stress induced on an aluminum substrate 108 by a multi-layer thin-film optical coating layer 120 to under 100 MPa. This level of stress on the aluminum substrate 108 may cause little if any bending or warping of the aluminum substrate 108, helping to ensure that an optical device 100 having a desired shape is achieved. Note, however, that the pre-stress layer 116 can be designed to reduce the stress induced on any suitable substrate 108 by any suitable optical coating layer 120 to any other suitable level (including those above and below 100 MPa).

It should be noted that, in some embodiments, it is possible to omit the layer 112 and simply use the layers 116 and 120 on a highly-polished substrate 108 or other substrate 108 having relatively low surface roughness. Also, in other embodiments, it is possible to omit the layer 112 and use the layers 116 and 120 on a substrate 108, where the layer 116 functions as both a finishing layer and a pre-stress layer. In these other embodiments, the layer 116 can be formed (such as via a thin-film vapor deposition technique or other technique) to have a desired stress that counteracts the stress of the layer 120, and the layer 116 can be polished (such as via an MRF process or other polishing technique) to reduce its surface roughness.

As a particular example of how the optical device 100 can be formed, a plasma ion-assisted deposition (PIAD) process can be performed within a LEYBOLD APS 1104 electron beam (e-beam) evaporator chamber or other chamber to deposit an amorphous silicon layer (layer 116) over a substrate 108 (with or without the layer 112). Such a chamber can be equipped with at least one electron beam gun and an advanced plasma source (APS). A silicon slug can be evaporated using the e-beam gun, and a silicon coating can then be deposited over the substrate 108 using plasma from the APS. The stress of the silicon coating can be controlled by adjusting a bias voltage of the APS, so the APS can be operated using a suitable bias voltage to manipulate the coating stress. Note, however, that other techniques can be used to form at least a pre-stress layer 116 to help compensate for stress created by an optical coating layer 120. For instance, other chambers used for ion beam sputtering, electron beam evaporation, or other formation techniques can be used, where the bias voltage or other characteristic or characteristics of the chamber or technique can be controlled to achieve a suitable level of stress in a layer of material.

Although FIGS. 1A and 1B illustrate one example of an optical device 100 having coating stress mitigation through front surface coating manipulation, various changes may be made to FIGS. 1A and 1B. For example, the optical device 100 can include any number of each of the layers 112, 116, and 120 as needed or desired. Also, at least one pre-stress layer 116 can be used with at least one optical coating layer 120 in any other suitable optical device in order to reduce stress on a substrate of the optical device. In addition, various other layers of material can be used in the optical device 100. As a particular example, in some embodiments, a layer of amorphous silicon can be formed over the substrate 108, and the finishing layer 112 can be formed on the layer of amorphous silicon.

Figure 2:
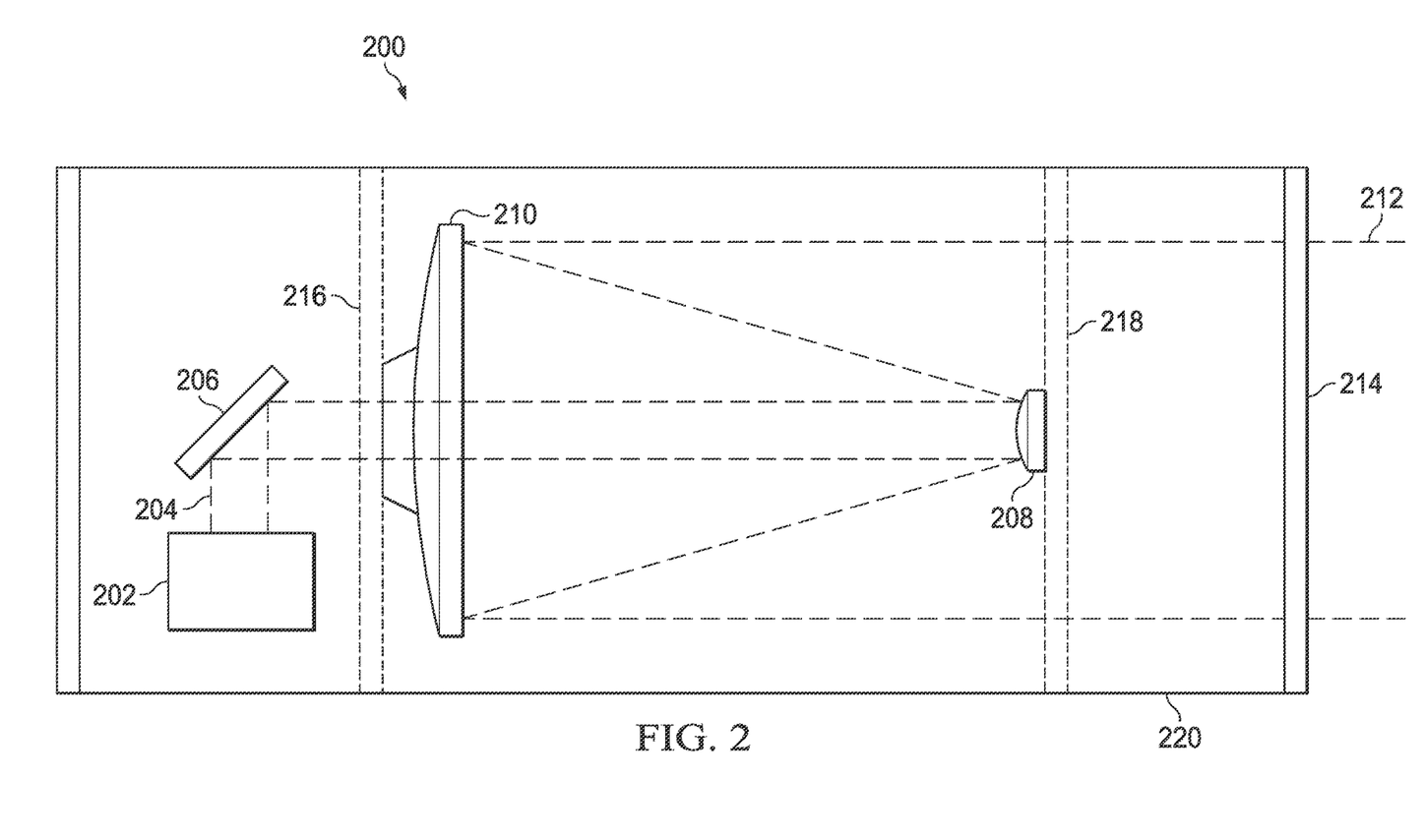
FIGS. 2 and 3 illustrate example systems using optical devices having coating stress mitigation through front surface coating manipulation in accordance with this disclosure.
Figure 3:
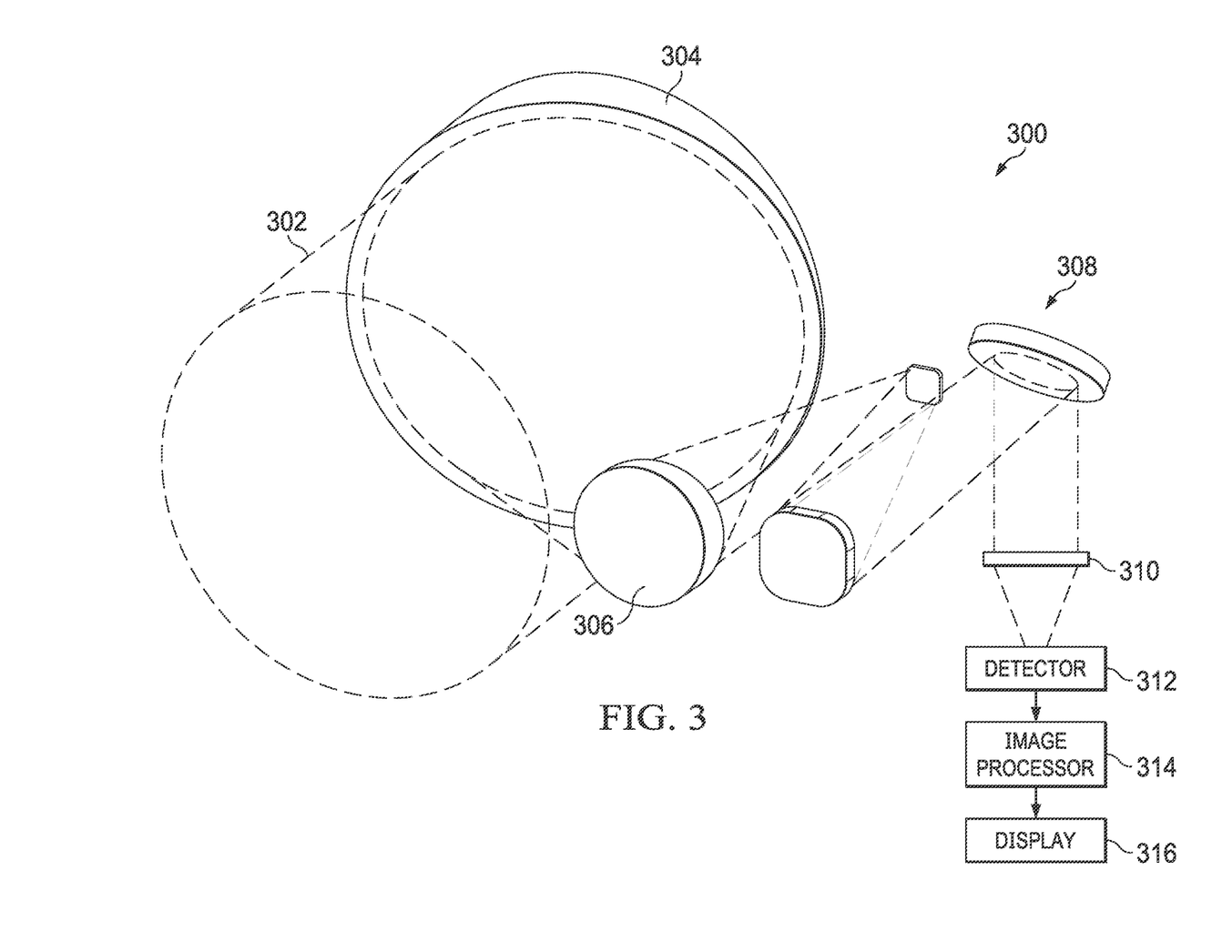

FIGS. 2 and 3 illustrate example systems using optical devices having coating stress mitigation through front surface coating manipulation in accordance with this disclosure. In particular, FIG. 2 illustrates an example high-energy laser system 200, and FIG. 3 illustrates an example imaging system 300. Each of these systems 200 and 300 includes at least one optical device that is configured to receive and provide an optical beam (in a modified or unmodified form), where coating stress mitigation has occurred in the at least one optical device through front surface coating manipulation.

As shown in FIG. 2, the system 200 includes a high-energy laser 202, which generally operates to produce a high-energy laser beam 204. The laser 202 represents any suitable source configured to generate at least one high-energy beam. In some embodiments, for example, the laser 202 can be implemented as described in U.S. Patent Application Publication Nos. 2017/0353005 and 2018/0013256 (both of which are hereby incorporated by reference in their entirety). However, any other suitable high-energy laser 202 (now known or later developed) can be used in the system 200. The beam 204 represents any suitable high-energy laser beam having any suitable cross-sectional size and power level. In general, a "high-energy" beam can represent a beam having about ten kilowatts of power or more.

A mirror 206 directs the beam 204 to a secondary mirror 208, which expands the beam 204 and directs the expanded beam towards a primary mirror 210. The primary mirror 210 reflects the expanded beam, which exits the system 200 as a high-energy output beam 212 (typically through an aperture or output window 214). The primary mirror 210 and the secondary mirror 208 can be coupled to support structures 216 and 218, respectively, which mount the mirrors 208 and 210 within a housing 220.

In some embodiments, one or more of the mirrors 206, 208, and 210 can be fabricated to include at least one pre-stress layer 116 that at least partially compensates for stress induced by at least one optical coating layer 120. In particular embodiments, the primary mirror 210 is fabricated to include at least one pre-stress layer 116 that at least partially compensates for stress induced by at least one optical coating layer 120, while the other mirrors 206 and 208 do not. At least the primary mirror 210 can include the at least one pre-stress layer 116 since it is a larger mirror and therefore susceptible to wavefront errors or other optical errors caused by bending or warping.

In this example, the primary mirror 210 is shown as having a substantially planar front surface. However, other forms for the primary mirror 210 can be used in the system 200 of FIG. 2. For example, the primary mirror 210 can have a convex, concave, or aspheric reflective front surface, which can depend (at least in part) on the particular needs of the specific application.

The laser system 200 can be used in a number of commercial and defense-related applications. For example, the laser system 200 can find use in commercial mining applications, such as in drilling, mining, or coring operations. For instance, the high-energy laser 202 can be used to soften or weaken an earth bed prior to drilling through the earth bed using drill bits. This can allow for fewer drill bit changes and extended lifetimes and reliabilities of the drill bits. Here, free-space propagation of the high-energy laser beam 212 from the output window 214 of the laser system 200 may be used, allowing deeper penetration at further distances compared to conventional fiber lasers.

The laser system 200 can also find use in remote laser welding, cutting, drilling, or heat treating operations, such as in industrial or other automation settings. The use of a high-power and high-beam quality system 200 allows the processing of thicker materials to occur at larger working distances from the system 200 while minimizing the heat-affected zone and maintaining vertical or other cut lines. Among other things, this helps to support welding or cutting operations where proximity to the weld or cut site is difficult or hazardous. It also helps to protect the system 200 and possibly any human operators from smoke, debris, or other harmful materials.

The laser system 200 can further find use in construction and demolition operations. Example operations can include metal resurfacing or deslagging, paint removal, and industrial demolition operations. The high-energy laser 202 can be used to ablate material much faster and safer compared to conventional operations. As a particular example of this functionality, the high-energy laser 202 can be used to support demolition of nuclear reactors or other hazardous structures. Here, the high-energy laser 202 can be used to cut through contaminated structures like contaminated concrete or nuclear containment vessels or reactors from long distances. This helps to avoid the use of water jet cutting or other techniques that create hazardous waste, such as contaminated water. It also provides improved safety since human operators can remain farther away from contaminated structures being demolished.

A number of additional applications are possible. For example, the laser system 200 can find use in power beaming applications, where high-power laser beams 212 are targeted to photovoltaic (solar) cells of remote devices to be recharged. The laser system 200 can also find use in hazardous material (HAZMAT) applications, where the laser 202 is used to heat and decompose hazardous materials into less harmful or non-harmful materials. Note that all of the above applications are for illustration only and do not limit this disclosure to any particular applications of the system 200.

As shown in FIG. 3, an incoming optical beam 302 can be received, such as via a telescope or other structure, at a first mirror 304. The first mirror 304 focuses the optical beam 302 and redirects the focused optical beam onto a second mirror 306. The second mirror 306 then redirects the focused optical beam to one or more additional optical devices 308. The additional optical device 308 can support any suitable function or functions. For instance, the additional optical devices 308 can include one or more mirrors for further redirecting the optical beam or splitters for dividing the optical beam into different portions. In general, the system 300 can include any suitable focal or afocal optical system components that are configured to receive and process at least one optical beam in some manner. Here, "processing" can include redirecting an optical beam, focusing or expanding an optical beam, splitting an optical, combining optical beams, measuring one or more characteristics of an optical beam, or other functions that alter or measure a beam in some manner.

A lens 310 eventually focuses at least a portion of the optical beam onto a detector 312. The detector 312 represents a camera, focal plane array, photodetector array, or other suitable structure configured to sense or measure the incoming optical beam. Depending on the implementation, the detector 312 can generate outputs that are provided to an image processor 314, which processes the data to generate images that can be presented to one or more users via one or more displays 316. The image processor 314 includes any suitable structure configured to process image data, such as one or more microprocessors, microcontrollers, digital signal processors, application specific integrated circuits (ASICs), field programmable gate arrays (FPGAs), or discrete circuitry. The display 316 includes any suitable structure configured to present images to at least one user. A housing can surround or otherwise contain some or all of the components shown in FIG. 3.

In some embodiments, one or more of the mirrors 304 and 306, the additional optical device(s) 308, and the lens 310 can be fabricated to include at least one pre-stress layer 116 that at least partially compensates for stress induced by at least one optical coating layer 120. In particular embodiments, the mirror 304 is fabricated to include at least one pre-stress layer 116 that at least partially compensates for stress induced by at least one optical coating layer 120, while the other mirror 306, the additional optical device(s) 308, and the lens 310 do not. At least the mirror 304 can include the at least one pre-stress layer 116 since it is a larger mirror and therefore susceptible to wavefront errors or other optical errors caused by bending or warping.

In this example, the mirror 304 has a concave front surface in order to support the focusing of the beam 302 onto the mirror 306. However, other forms for the mirror 304 can be used in the system 300 of FIG. 3. For example, the mirror 304 can have a planar, convex, more or less concave, or aspheric reflective surface, which can depend (at least in part) on the particular needs of the specific application.

The imaging system 300 can be used in a number of commercial and defense-related applications. For example, the imaging system 300 can find use in long-range imaging applications, such as coherent laser detection and ranging (LADAR) systems. In these types of systems, a laser beam or other electro-magnetic energy can be directed towards a specific target or a particular area. Energy reflected from the target or area can be received by the imaging system 300 and processed to generate images of the target or area. Note that the above application is for illustration only and does not limit this disclosure to any particular applications of the system 300.

Although FIGS. 2 and 3 illustrate examples of systems 200 and 300 using optical devices having coating stress mitigation through front surface coating manipulation, various changes may be made to FIGS. 2 and 3. For example, the systems 200 and 300 shown in FIGS. 2 and 3 have been simplified for ease of illustration and explanation in order to demonstrate example ways in which an optical device having coating stress mitigation through front surface coating manipulation can be used. There are numerous laser systems, imaging systems, and other systems in which large mirrors or other optical devices can be used. Any of those systems can include at least one optical device having coating stress mitigation through front surface coating manipulation.

Figure 4:
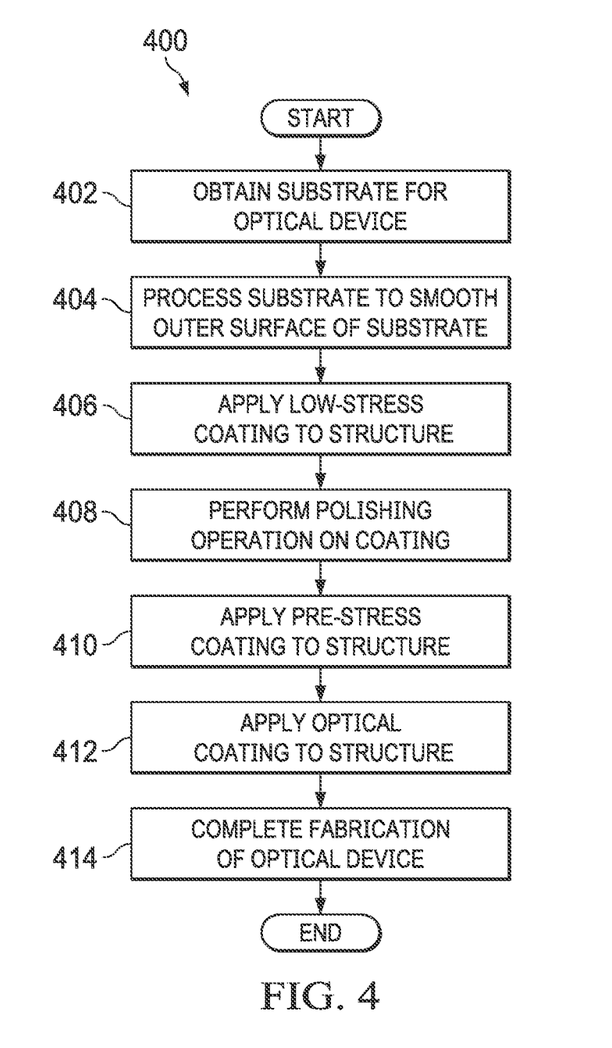
FIG. 4 illustrates an example method for coating stress mitigation through front surface coating manipulation on an optical device in accordance with this disclosure.

FIG. 4 illustrates an example method 400 for coating stress mitigation through front surface coating manipulation on an optical device in accordance with this disclosure. For ease of explanation, the method 400 is described as being used to form the optical device 100 of FIGS. 1A and 1B, which can be used in the system 200 or 300 of FIG. 2 or 3. However, the method 400 can be used to form any other suitable optical device, and the optical device can be used in any other suitable system.

As shown in FIG. 4, a substrate for an optical device is obtained at step 402. This can include, for example, manufacturing or otherwise obtaining a substrate 108 to be used to form a large mirror or other optical device. As noted above, the substrate 108 can be formed from any suitable material(s), such as aluminum or an aluminum alloy. The substrate is processed to substantially smooth the outer surface of the substrate at step 404. This can include, for example, using a DPT technique to smooth the outer surface 110 of the substrate 108. As noted above, the DPT technique can be highly effective but does allow surface roughness to remain on the surface 110 of the substrate 108.

A coating of material (referred to here as a low-stress layer) is applied to the structure at step 406. This can include, for example, depositing or otherwise forming the finishing layer 112 over the surface 110 of the substrate 108. The finishing layer 112 can be formed from any suitable material(s), such as nickel-chromium, amorphous silicon, or germanium. The finishing layer 112 can also be formed in any suitable manner, such as a thin-film vapor deposition technique or other deposition technique. A polishing operating is performed on the coating of material at step 408. This can include, for example, performing a magneto-rheological finishing process or other polishing process to smooth the surface 114 of the finishing layer 112. Ideally, the surface 114 of the finishing layer 112 obtains a lower surface roughness compared to the surface 110 of the substrate 108.

A coating of material (referred to here as a pre-stress layer) is applied to the structure at step 410. This can include, for example, depositing or otherwise forming the pre-stress layer 116 over the surface 114 of the finishing layer 112. The pre-stress layer 116 can be formed from any suitable material(s), such as nickel-chromium, amorphous silicon, or germanium. The pre-stress layer 116 can also be formed in any suitable manner, such as a thin-film vapor deposition technique or other deposition technique.

A coating of material (referred to here as an optical coating layer) is applied to the structure at step 412. This can include, for example, depositing or otherwise forming the optical coating layer 120 over the pre-stress layer 116. The optical coating layer 120 can be formed from any suitable material(s), such as a multi-layer dielectric film (like a broadband high reflector multi-layer dielectric film). The optical coating layer 120 can also be formed in any suitable manner, such as an ion beam sputtering technique or an electron beam evaporation technique (with or without ion assistance coating techniques).

Fabrication of the optical device is completed at step 414. This can include, for example, forming a thin protective overcoat over the optical coating layer 120. Example overcoats can be formed from silicon oxide, silicon dioxide, tantalum oxide, titanium oxide, or zirconium oxide. This can also include performing any other desired operations to form a completed optical device 100.

The stress induced by the pre-stress layer at least partially (and hopefully substantially or completely) compensates for the stress induced by the optical coating layer. As noted above, in some cases, the optical coating layer 120 induces a large compressive stress within the optical device 100, and the pre-stress layer 116 creates a large tensile stress to compensate for the compressive stress. However, other stresses can be created by the layers 116 and 120. Ideally, the pre-stress layer 116 creates enough compensating stress to prevent the underlying substrate 108 from warping or bending (at least to any optically-noticeable extent).

Although FIG. 4 illustrates one example of a method 400 for coating stress mitigation through front surface coating manipulation on an optical device, various changes may be made to FIG. 4. For example, while shown as a series of steps, various steps in FIG. 4 can overlap, occur in parallel, or occur any number of times. Also, note that steps 402 and 404 here may assume that the substrate 108 is being created as a polished metal substrate. However, any other suitable substrate can be used to form an optical device having at least one pre-stress layer used for coating stress mitigation.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function.

Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
an optical device comprising:
   a substrate having a concave shape with a non-uniform thickness that tapers out from a center of the substrate;
   a first layer of material over the substrate and extending around a back portion of the substrate;
   a second layer of material comprising an optical coating over the first layer of material and over the substrate and extending around the back portion of the substrate; and
   a third layer of material positioned between the substrate and the first layer of material, wherein a surface of the third layer on which the first layer is applied is polished;
wherein the first layer of material creates a first stress within the optical device that counteracts a second stress within the optical device created by the second layer of material.

2. The apparatus of claim 1, wherein:
the first layer of material comprises one of: nickel-chromium, amorphous silicon, or germanium; and
the third layer of material comprises one of: nickel-chromium, amorphous silicon, or germanium.

3. The apparatus of claim 1, wherein:
the first layer of material has a thickness of about 50 µm or less; and
the second layer of material has a thickness of about 50 µm or less.

4. The apparatus of claim 1, wherein:
the substrate comprises an aluminum or aluminum alloy substrate having a smoothed outer surface; and
the third layer of material is located over the smoothed outer surface of the substrate.

5. The apparatus of claim 4, wherein:
the smoothed outer surface of the substrate has a surface roughness of about 80 Angstroms root mean square; and
an outer surface of the second layer of material has a surface roughness of about 10 Angstroms to about 25 Angstroms root mean square.

6. The apparatus of claim 1, wherein:
the optical device comprises a mirror; and
the optical coating comprises a reflective coating.

7. The apparatus of claim 1, wherein each of the first layer and the second layer has a non-uniform thickness.

8. The apparatus of claim 1, wherein:
the second layer of material creates a compressive stress within the optical device; and
the first layer of material creates a tensile stress within the optical device that counteracts the compressive stress within the optical device.

9. A system comprising:
a plurality of optical devices configured to receive and process at least one optical beam, wherein each of at least one of the optical devices comprises:
   a substrate having a concave shape with a non-uniform thickness that tapers out from a center of the substrate;
   a first layer of material over the substrate and extending around a back portion of the substrate;
   a second layer of material comprising an optical coating over the first layer of material and over the substrate and extending around the back portion of the substrate; and
   a third layer of material positioned between the substrate and the first layer of material, wherein a surface of the third layer on which the first layer is applied is polished;
wherein the first layer of material creates a first stress within the optical device that counteracts a second stress within the optical device created by the second layer of material.

10. The system of claim 9, wherein, in each of the at least one of the optical devices;
the first layer of material comprises one of: nickel-chromium, amorphous silicon, or germanium; and
the third layer of material comprises one of: nickel-chromium, amorphous silicon, or germanium.

11. The system of claim 10, wherein, in each of the at least one of the optical devices:
the first layer of material has a thickness of about 50 µm or less; and
the second layer of material has a thickness of about 50 µm or less.

12. The system of claim 9, wherein, in each of the at least one of the optical devices:
the substrate comprises an aluminum or aluminum alloy substrate having a smoothed outer surface; and
the third layer of material is located over the smoothed outer surface of the substrate.

13. The system of claim 12, wherein, in each of the at least one of the optical devices:
the smoothed outer surface of the substrate has a surface roughness of about 80 Angstroms root mean square; and
an outer surface of the second layer of material has a surface roughness of about 10 Angstroms to about 25 Angstroms root mean square.

14. The system of claim 9, wherein:
the system further comprises a high-energy laser configured to generate an optical beam;
the optical devices are configured to expand the optical beam and output the expanded optical beam;
the optical devices include a secondary mirror and a primary mirror; and
at least the primary mirror includes the substrate and the first and second layers.

15. The system of claim 9, wherein:
the system further comprises:
   a detector configured to receive and measure at least a portion of an incoming optical beam; and
   an image processor configured to generate one or more images based on outputs of the detector;
the optical devices are configured to direct at least the portion of the incoming optical beam to the detector;

the optical devices include a first mirror configured to receive and focus the incoming optical beam onto a second mirror; and at least the first mirror includes the substrate and the first and second layers.

16. A method comprising:

forming a first layer of material over a front surface and a back portion of a substrate of an optical device, the substrate having a concave shape with a non-uniform thickness that tapers out from a center of the substrate;

forming a second layer of material comprising an optical coating over the first layer of material and over the substrate and extending around the back portion of the substrate; and forming a third layer of material over the substrate, the first layer of material formed over a polished surface of the third layer of material;

wherein the first layer of material creates a first stress within the optical device that counteracts a second stress within the optical device created by the second layer of material.

17. The method of claim 16, further comprising:

smoothing an outer surface of the substrate by performing a diamond point turning (DPT) process.

18. The method of claim 16, further comprising:

polishing the third layer of material by performing a magneto-rheological finishing (MRF) process.

19. The method of claim 16, wherein:

the second layer of material creates a compressive stress within the optical device; and the first layer of material creates a tensile stress within the optical device that counteracts the compressive stress within the optical device.

20. The method of claim 16, wherein each of the first layer and the second layer has a non-uniform thickness.

* * * * *